May 29, 1928.

H. M. H. REUFEL

DEVICE FOR ADJUSTING BALANCES

Filed April 14, 1925

1,671,127

Inventor
Heinrich Martin Hubert Reufel
By: E. T. & J. F. Brandenburg attorneys.

Patented May 29, 1928.

1,671,127

UNITED STATES PATENT OFFICE.

HEINRICH MARTIN HUBERT REUFEL, OF EINDHOVEN, NETHERLANDS, ASSIGNOR TO N. V. PHILIPS' GLOEILAMPENFABRIEKEN, OF EINDHOVEN, NETHERLANDS.

DEVICE FOR ADJUSTING BALANCES.

Application filed April 14, 1925, Serial No. 23,061, and in the Netherlands June 3, 1924.

This invention relates to a device for adjusting a balance, more particularly for gradually adjusting a balance.

Such devices are already known. Frequently a sliding weight is used for adjusting balances more or less gradually. With such devices however the adjustment is always effectuated more or less by degrees owing to which after each displacement of the sliding weight some time is lost for giving the balance the occasion of coming into its position of equilibrium.

The invention has for its object to prevent such loss of time by causing the adjustment to be carried out rapidly and without shocks. At the same time the invention has for its object to suggest a device which can be mounted in a simple manner to any balance.

According to the invention a vessel is mounted on one of the lever arms of a balance whilst means are provided for supplying and discharging a liquid to and from said vessel. The lever arm to which the vessel is secured, may be chosen at will and need not always be a bascule lever but may be chosen out of any lever system of the balance such for example as the lever arm serving for moving a sliding weight along it.

According to the invention the supply and the discharge of the liquid to and from the vessel occurs preferably through a tube opening lying in the lever axis.

According to the invention it deserves recommendation to provide a receptacle which is in open communication with the vessel and which is provided with devices for varying the pressure on the liquid. In an efficient construction care is further taken that in each position of the balance lever the liquid level in the vessel is higher than the receptacle.

The receptacle for holding the liquid may be secured to the lever arm, in which case the flow of the liquid in more or less large quantities from the receptacle and to the vessel causes the adjustment of the balance. It has however been found that a rigid arrangement of the receptacle is to be preferred in which case a connection is provided between the receptacle and the tube leading to the vessel, this connection allowing the end of said tube to turn and therefore being preferably made of elastic material.

The receptacle and the vessel may have but small capacities and yet an effective adjustment may be obtained by using a liquid having a high specific weight. Preferably mercury is used for this purpose.

Moreover it deserves recommendation to give the vessel secured to the lever arm such a shape that the variations of the liquid level in the vessel caused by the rotary motion of the lever do not exert any influence on the adjustment of the balance. For this purpose the vessel may be given the shape of a right cylinder the descriptive lines of which are parallel to the lever axis. The vessel may also be made spherical. When giving the vessel such a shape it is obtained that the scale division of the balance remains valid for any quantity of liquid the vessel contains. If, namely, in consequence of the heeling over the vessel the division of the liquid in the vessel is such that the centre of gravity of the liquid does not always remain perpendicularly below the centre of gravity of the vessel, a difference in liquid level will cause that in different positions of the lever the vessel and its contents have a different effect on the deflection of the balance if, namely, the quantity of liquid the vessel contains, does not correspond to the quantity with which the balance has been gauged. Said disadvantage can be obviated by giving the vessel such a shape that the variations of the level of the liquid caused by the rotary motion of the lever have no influence on the adjustment of the balance.

The invention will be more clearly understood with reference to the accompanying drawings representing, by way of example, an embodiment of the invention in which a device according to the invention is secured to a sliding weight arm of a balance not shown.

Figure 1:
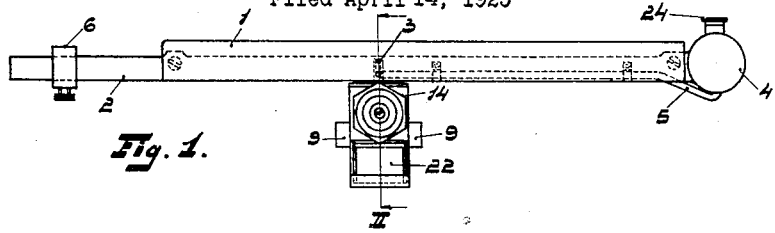
Figure 1 is a front view of the device.

In these figures the reference numeral 1 indicates the lever arm along which the sliding weight of a balance is movable. The axis on which this lever turns, is indicated in the figures by the reference numeral 3. In the drawings, however, the further arrangement of the balance and the attachment of the sliding weight arm thereto are omitted as they are of no importance for a right understanding of the invention. By means of bolts the sliding weight arm 2 is secured to a lever 1, one end of which carries a cylindrical vessel 4. This vessel communicates by means of a tube 5 with a recepticle 8, which during the operation is filled with mercury. The lever 1 is provided with an adjustable weight 6 which serves as a counter weight for the vessel 4.

Figure 2:
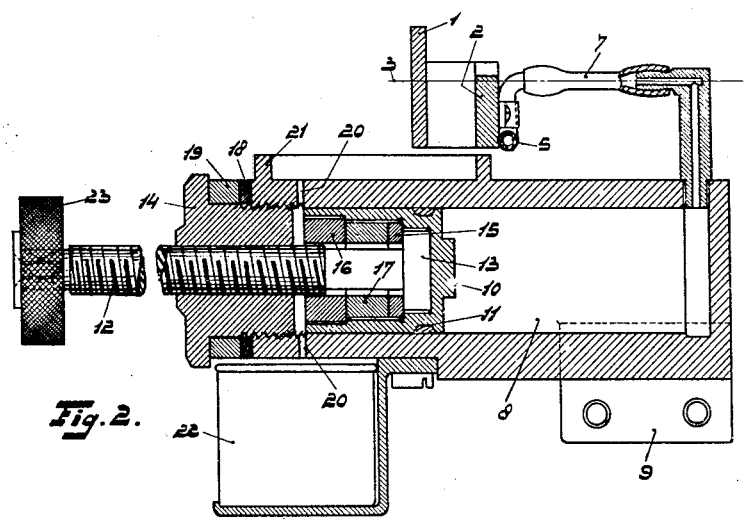
Figure 2 is a section taken on the line II—II in Figure 1 on an enlarged scale.
Figure 3:
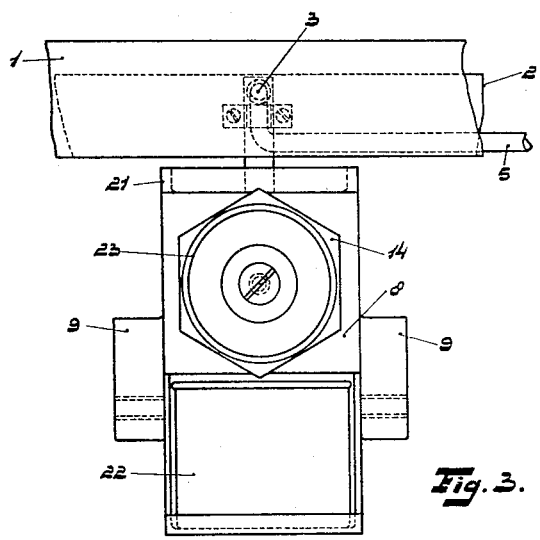
Figure 3 is a front view of the receptacle.

One of the ends of the tube 5 is preferably located in the axis 3. A tube 7 of rubber or similar material, which is in connection with the recepticle 8, is clamped around said end as shown in Figure 2. The arrangement of an end of the tube 5 in the axis 3 offers the advantage that when the sliding weight lever turns the flexible tube 7 is but slightly twisted, but is not moved in a direction at right angles to the center line. With such an arrangement only a short length of tube is needed which is not taken along by the lever as a dead weight. The receptacle 8 may be secured to a fixed member of the balance by means of projections 9.

In the receptacle 8 is arranged a piston 10 which may be packed by a felt ring 11 or in any other manner. The piston can move to and fro in the receptacle 8 by means of a rod 12 which is provided with thread and which is movable in the cover 14 of the receptacle. The rod 12 is provided with an enlarged head 13, which is locked up in the piston 10 by a plate 15 and two nuts 16 and 17 which are provided respectively with a righthanded thread and with a lefthanded one. Owing to this the enlarged head 13 can turn within the piston 10 so that the piston itself only receives the to and fro motion and not the rotary motion from the rod 12.

The cover 14 is secured in the receptacle 8 by means of a thread whilst a rubber ring 18 and a press ring 19 placed against it, serve to stop any mercury which should leak through the thread. Besides, there are provided apertures 20 in the upper surface and in the bottom of the receptacle through which the mercury which leaks along the packing ring 11, has an easy way outwards. This mercury is gathered in a receptacle 21 cast to the receptacle 8 or in a vessel 22 secured to the receptacle 8.

By turning a handle 23 secured to the rod 12, the mercury is supplied to and discharged from the vessel 4, owing to which a gradual adjustment without shocks can be obtained, which in the construction illustrated serves as supplementary precise adjustments beside the rough adjustment obtained by moving the sliding weight along the arm 2.

Mercury can be added at the lid 24 on the vessel 4.

The invention is especially advantageous for those balances with which the net weight of a number of objects packed in packing material must be measured. In such cases the balance can be rapidly adjusted on a determined member of the scale with the aid of the device above described and after removing the objects the pointer indicates only the weight of these objects and not the weight of the packing material. It will be obvious however, that the invention is not at all restricted to the measurements of such objects.

What I claim is:—

1. A device for adjusting a balance comprising a vessel mounted on one of the lever arms of the balance, a receptacle being in open communication with the vessel, and a device for varying the pressure on the liquid in said receptacle, said device being mounted on said receptacle, the latter being rigidly arranged on the balance.

2. A device for adjusting a balance comprising a vessel mounted on one of the lever arms of the balance, a receptacle being in open communication with the vessel, said vessel being rigidly arranged on the balance, and a device for varying the pressure on the liquid in said receptacle, the liquid level in said vessel being in each position of the lever of the balance higher than the liquid level in said receptacle.

3. A device for adjusting a balance comprising a vessel mounted on one of the lever arms of the balance, a receptacle being in open communication with the vessel and rigidly arranged on the balance, a device for varying the pressure on the liquid in said receptacle, a tube opening lying in the axis of the lever, a tube leading to said vessel, and a connection between the tube opening and said tube being adapted to allow the end of said tube to turn, the liquid being supplied and discharged through said tube opening and said tube.

4. A device for adjusting a balance comprising a vessel mounted on one of the lever arms of the balance, a receptacle being in open communication with the vessel and rigidly arranged on the balance, a device for varying the pressure on the liquid in said receptacle, a tube opening lying in the axis of the lever, a tube leading to said vessel, and a connection between the tube opening and said tube, being adapted to allow the end of said tube to turn, the liquid being supplied and discharged through said tube opening and tube, the liquid level in said vessel lying in each position of the lever of the balance higher than the liquid level in said receptacle.

5. A device for adjusting a balance comprising a vessel rigidly secured to one of the lever arms of the balance, and a receptacle being in open communication with the vessel and provided with a device for varying the pressure on the liquid in said receptacle, the liquid level in said vessel being in each position of the level higher than the liquid in said receptacle.

6. A device for adjusting a balance comprising a vessel rigidly secured to one of the lever arms of the balance, a receptacle in open communication with said vessel, a device for varying the pressure of the liquid in said receptacle, and a tube opening lying in the axis of the lever of the balance, said tube opening being connected to said vessel by a tube connection which allows the end of said connection to turn.

7. A device for adjusting a balance comprising a vessel rigidly secured to one of the lever arms of the balance, said vessel having such a shape that the variation of the liquid in the vessel caused by the rotary motion of the lever does not exert any influence on the adjustment of the balance, and a receptacle being in open communication with said vessel, and provided with a device for varying the pressure on the liquid in said receptacle, said receptacle being rigidly arranged on the balance.

8. A device for adjusting a balance comprising a vessel rigidly secured to one of the lever arms of the balance, said vessel having the shape of a right cylinder the descriptive lines of which are parallel to the axis of the lever, a receptacle being in open communication with said vessel, a device being provided in said receptacle adapted to vary the pressure of the liquid in said vessel, a tube opening lying in the axis of the lever, said tube opening being connected by a tube to said vessel, the liquid being supplied and discharged through said tube opening.

9. A device for adjusting a balance comprising a vessel rigidly secured to one of the lever arms of the balance, said vessel having such a shape that the variation of the liquid level in the vessel caused by the rotary motion of the lever does not exert any influence on the adjustment of the balance, a receptacle being in open communication with the vessel and rigidly arranged on the balance, a device for varying the pressure on the liquid in said receptacle, a tube opening lying in the axis of the lever, a tube leading to said vessel, and a connection between the tube opening and said tube, being adapted to allow the end of said tube to turn, the liquid being supplied and discharged through said tube opening and tube, the liquid level in said vessel lying in each position of the lever of the balance higher than the liquid level in said receptacle.

In testimony whereof I affix my signature, at the city of Eindhoven, this 27th day of March, A. D. 1925.

HEINRICH MARTIN HUBERT REUFEL.